(12) United States Patent
Schmidt et al.

(10) Patent No.: US 8,559,949 B2
(45) Date of Patent: Oct. 15, 2013

(54) BASE STATION SUBSYSTEM MULTIPLEXER WITH SUPPORT FOR LOCAL SWITCHING

(75) Inventors: Robert D. Schmidt, Redwood City, CA (US); Siu Bun Chan, Kowloontong (CN); Qiming Zhu, Palo Alto, CA (US)

(73) Assignee: Altobridge Limited (IE)

( * ) Notice: Subject to any disclaimer, the term of this patent is extended or adjusted under 35 U.S.C. 154(b) by 593 days.

(21) Appl. No.: 12/652,495

(22) Filed: Jan. 5, 2010

(65) Prior Publication Data

US 2010/0261478 A1 Oct. 14, 2010

Related U.S. Application Data

(60) Provisional application No. 61/142,783, filed on Jan. 6, 2009, provisional application No. 61/162,813, filed on Mar. 24, 2009.

(51) Int. Cl.
*H04W 4/00* (2009.01)
*H04L 12/66* (2006.01)

(52) U.S. Cl.
USPC ............. 455/435.1; 455/422.1; 370/353

(58) Field of Classification Search
USPC ............. 455/458, 426, 567, 445; 370/353
See application file for complete search history.

(56) References Cited

U.S. PATENT DOCUMENTS

| | | | |
|---|---|---|---|
| 2002/0061756 A1* | 5/2002 | Bleckert et al. | 455/458 |
| 2003/0013489 A1* | 1/2003 | Mar et al. | 455/560 |
| 2006/0073811 A1* | 4/2006 | Ekberg | 455/411 |
| 2007/0117561 A1* | 5/2007 | Shu | 455/428 |
| 2010/0029278 A1* | 2/2010 | Fang et al. | 455/436 |
| 2010/0197311 A1* | 8/2010 | Walldeen et al. | 455/444 |
| 2011/0237264 A1* | 9/2011 | Silver | 455/445 |

\* cited by examiner

*Primary Examiner* — George Eng
*Assistant Examiner* — Nizar Sivji
(74) *Attorney, Agent, or Firm* — Bryan Cave LLP (57) ABSTRACT

In one embodiment, a wireless system comprises a host MSC/VLR of a public land mobile network (PLMN) and a plurality of base station subsystems (BSSs). Each BSS includes a respective base station controller (BSC) and one or more base transceiver stations (BTSs). The wireless system further comprises a virtual base station controller (VBSC) communicatively coupled to the plurality of BSSs and the host MSC/VLR. The VBSC appears, from the perspective of the host MSC/VLR, to be a base station controller for the BTSs in the plurality of BSSs. The VBSC and at least some of the BSSs include functionality for locally switching calls in the BSSs.

27 Claims, 7 Drawing Sheets

BASE STATION SUBSYSTEM MULTIPLEXER WITH SUPPORT FOR LOCAL SWITCHING

CROSS-REFERENCE TO RELATED APPLICATIONS

This application claims the benefit of U.S. Provisional Application Ser. No. 61/162,813, filed Mar. 24, 2009, and U.S. Provisional Application Ser. No. 61/142,783, filed Jan. 6, 2009, both of which are hereby incorporated herein by reference.

BACKGROUND

In a typical cellular wireless network, multiple base station subsystems are coupled to a mobile switching center (MSC). Each base station subsystem (BSS) includes multiple base transceiver stations that communicate with wireless mobile units using one or more air interfaces. Each BSS also includes a base station controller (BSC) that manages the base transceiver stations and that communicates with the MSC. Each BSC is connected to the MSC using a suitable communication link. The link between each BSC and the MSC is also referred to here as the "backhaul" link.

One common BSS configuration is a "macrocell" configuration in which relatively few high-powered, high-capacity base transceiver stations provide wireless coverage within a relatively large geographic area (also referred to as a "macrocell"). However, conventional macrocell BSS equipment is typically large and requires a central site in which to deploy the BSC equipment. Thus, conventional macrocell BSS equipment may not be suitable in some applications.

Other BSS configurations make use of relatively low-powered, low-capacity base transceiver stations that provide wireless coverage within a relatively small geographic area. Examples of such BSS configurations include "microcell" and "picocell" configurations. The use of such alternative BSS configurations provides additional flexibility in configuring a cellular wireless network.

However, issues can arise with using such alternative BSS configurations with MSC equipment that was designed for use with conventional macrocell BSS equipment. For example, it may be difficult from a network planning and management standpoint to use conventional MSC equipment with a large number of BSSs that are implemented using different types of BSS equipment since the MSC may not be able to be configured to work with multiple different types of BSS equipment at the same time.

Moreover, in some applications, the backhaul link is implemented using a relatively expensive communication link such as a satellite link. In such applications, it is desirable to reduce the amount of data that must be communicated over this backhaul link. One way to do this is to use local switching within each BSS, where calls between two mobile units that are served by the same BSS are cross-connected within the BSS. In this way, the call data for such locally switched calls need not be communicated over the backhaul link to the MSC for switching by the MSC.

In US Patent Publication 2008-0310404 (U.S. patent application Ser. No. 11/914,633, filed on Aug. 8, 2008), a local switching scheme is described in which local media gateways are co-located within each BSS. In this scheme, in order for a call between two mobiles units that are both served by the same BSS to be locally switched, the MSC is modified to include functionality that selects the appropriate local media gateway to locally switch the call. In other words, with this local switching scheme, the MSC is modified to support locally switching.

SUMMARY

One embodiment is directed to a wireless system. The wireless system comprises a host MSC/VLR of a public land mobile network (PLMN) and a plurality of base station subsystems (BSSs). Each BSS includes a respective base station controller (BSC) and one or more base transceiver stations (BTSs). The wireless system further comprises a virtual base station controller (VBSC) communicatively coupled to the plurality of BSSs and the host MSC/VLR. The VBSC appears, from the perspective of the host MSC/VLR, to be a base station controller for the BTSs in the plurality of BSSs. The VBSC and at least some of the BSSs include functionality for locally switching calls in the BSSs.

Another embodiment is directed to a method of determining a MSISDN for a subscriber. The method comprises receiving an identifier associated with the subscriber from a first leg of a call and sending a short message service (SMS) message that appears to be from the subscriber to a virtual subscriber, where the SMS message is not actually sent from user equipment associated with the subscriber but from a first function within the wireless communication system. The virtual subscriber is associated with a second function within the wireless communication system. The method further comprises receiving the SMS message by the second function associated with the virtual subscriber and extracting the MSISDN from the received SMS message.

Another embodiment is directed to a method of determining if the legs of calls should be locally switched, where each call comprise a first leg and a second leg. The method comprises inserting user-to-user information into at least one message that relates to the first leg of a first call, the inserted user-to-user information including at least one identifier. The method further comprises checking messages related to the second legs of a set of calls to see if any include user-to-user information comprising the identifier. The method further comprises, if any messages related to the second leg of a call includes user-to-user information comprising the identifier, checking if the first leg and that second leg are terminated in a same routing zone of a base station subsystem and, if they are, causing the first leg and that second leg to be locally switched within the routing zone.

Another embodiment is directed to a method of determining if the legs of calls should be locally switched, where each call comprises a first leg and a second leg. The method comprises inserting a dual-tone multi-frequency (DTMF) tone into at least one message that relates to the first leg of a first call, the inserted DTMF being associated with the first leg of the first call. The method further comprises checking messages related to the second legs of a set of calls to see if any include the inserted DTMF tone. The method further comprises, if any messages related to the second leg of a call includes the inserted DTMF tone, checking if the first leg and that second leg are terminated in a same routing zone of a base station subsystem and, if they are, causing the first leg and that second leg to be locally switched within the routing zone.

Another embodiment is directed to a controller system for coupling a host MSC/VLR of a public land mobile network (PLMN) to a plurality of base station subsystems (BSSs), where each BSS includes a respective base station controller (BSC) and one or more base transceiver stations (BTSs). The controller system comprises a multiplexer function that routes control plane messages received form the host MSC/

VLR to an appropriate one of the BSSs and that performs point-code address translation for messages communicated among the host MSC/VLR and the BSSs. The controller system further comprises a local switching function that determines when calls handled by the BSSs should be locally switched. The controller system appears, from the perspective of the MSC/VLR, to be a base station controller for the BTSs in the plurality of BSSs.

DETAILED DESCRIPTION

Figure 1:
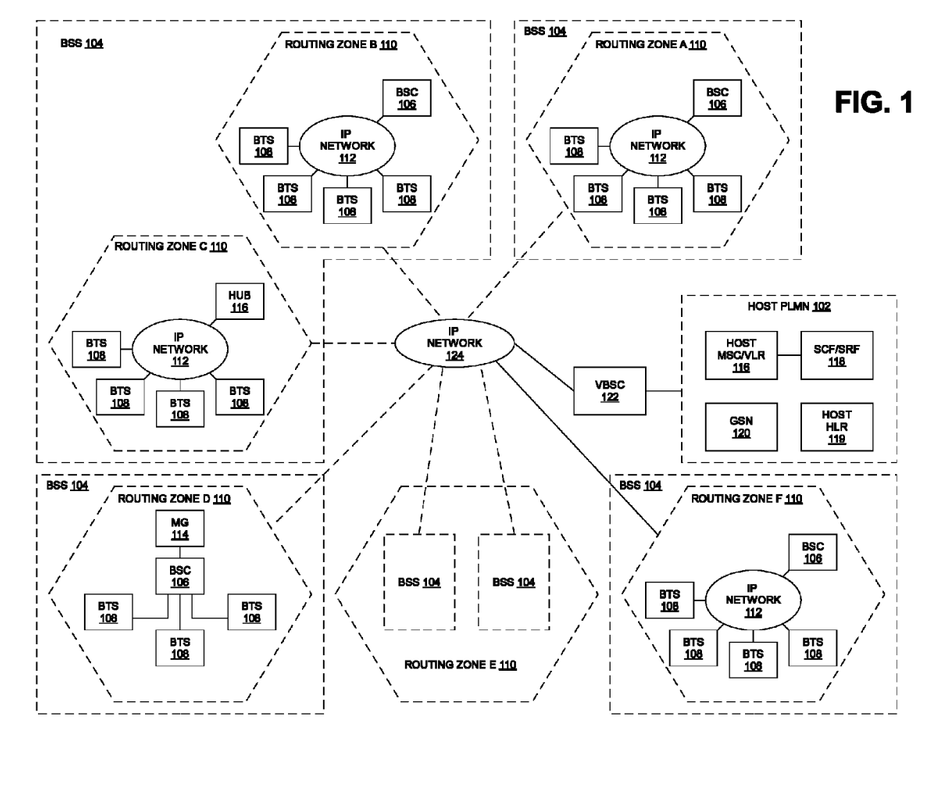
FIGS. 1 and 2 are block diagrams of one embodiment of a wireless communication system.
Figure 2:
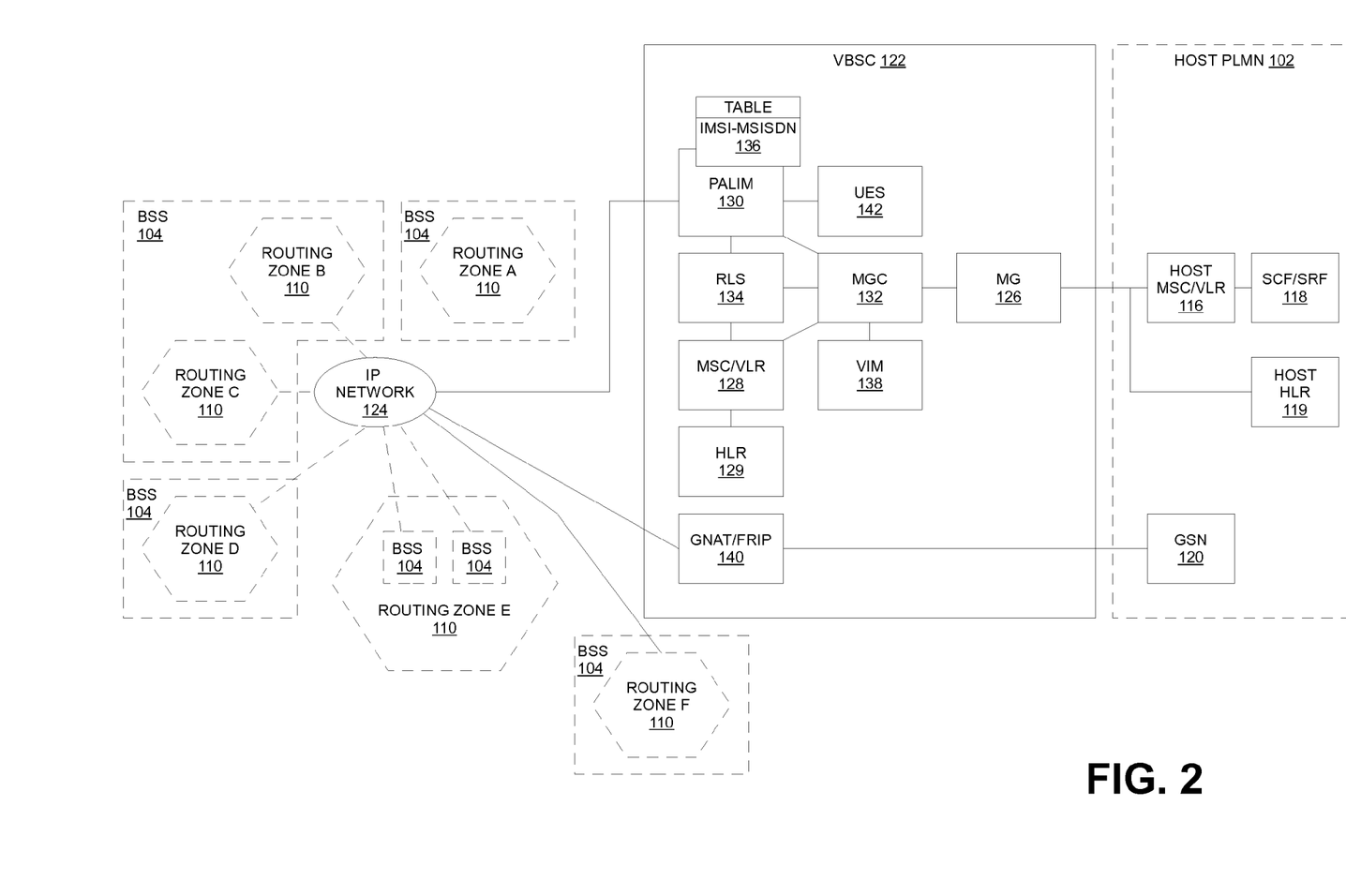

FIGS. 1 and 2 are block diagrams of one embodiment of a wireless communication system 100 suitable for use with the virtual base station controller (VBSC) functionality described below. The system 100 is coupled to a public land mobile network (PLMN) 102 (also referred to here as the "host" PLMN 102). The wireless communication system 100 is described here as being implemented in order to support one or more of the Global System for Mobile communication (GSM) family of telephony and data specifications and standards. It is to be understood, however, that other embodiments are implemented to support other wireless specifications or standards including, for example, one or more of the CDMA family of telephony and data standards (including, for example, the IS-95, CDMA2000, and EV-DO standards).

The system 100 comprises a plurality of base station subsystems 104. Each of the base station subsystems 104 implements at least one air interface that enables it to communicate with at least one wireless device located within a coverage area associated with that base station subsystem 104. In the particular embodiment shown in FIG. 1, the wireless device is a GSM mobile station (such as a mobile telephone or a personal digital assistant) that is able to at least make and receive telephone calls and to send and receive packet data in accordance with the General Packet Radio Service (GPRS) family of GSM standards. In this embodiment, the BSS 104 supports at least one GSM telephony air interface that enables the BSS 104 (and the other elements of the first PLMN 102) to communicate with a wireless device that is able to make and receive telephone calls and to send and receive packet data.

Each BSS 104 comprises a respective base station controller (BSC) 106 and one or more base transceiver stations (BTS) 108. In the particular embodiment shown in FIGS. 1 and 2, each BSC 106 implements GSM base station controller functions including, for example, base station management (including radio channel allocation, call handovers among base stations, and base transceiver station configuration), software and alarm handling, and operations and maintenance support. Moreover, in this embodiment, each of the BSSs 104 includes GPRS packet control unit (PCU) functionality for handling GPRS packet data. Each BTS 108 implements GSM base station functionality including, for example, one or more radio transceiver (TRXs), power amplifiers, combiners, duplexers, and antennas (and/or suitable interfaces to connect the BTS 108 to one or more antennas).

Each BSS 104 is associated with one or more routing zones 110. A routing zone 110 comprises a cluster of BTSs 108, and each routing zone 110 is associated with one or more BSSs 104. In the particular embodiment shown in FIGS. 1 and 2, one BSS 104 includes two routing zones 110 (routing zones B and C), three other BSSs 104 include only one routing zone 110 (routing zone A, routing zone D, and routing zone F) and another routing zone 110 (routing zone E) includes two BSSs 104. The BTSs 108 within routing zone C are controlled by the BSC 106 that is located within the routing zone B.

In the particular embodiment shown in FIGS. 1 and 2, routing zones A, B, C, D, and E are located in a remote location relative to the host PLMN 102 and are coupled to the host PLMN 102 via relatively expensive backhaul communication links such as satellite communication links (shown in FIGS. 1 and 2 using dashed lines). These routing zones 110 are also referred to here as "remote" routing zones 110. Each of the remote routing zones A, B, C, D, and E includes functionality for handling the local switching of voice and data services. This local switching is performed under the control of the VBSC 122 (described below). By locally switching calls where both legs of the call terminate within the same routing zone 110, the bearer traffic for such calls need not be backhauled to the host PLMN 102 for switching. In this particular embodiment, the backhaul link is implemented using an IP network 124, and communications occur over the backhaul link using a GSM A interface that is implemented over an IP link (also referred to here as an "A-over-IP" interface).

Also, in this embodiment, routing zone F is located relatively close to the host PLMN 102 and is coupled to the host PLMN 102 using relatively inexpensive backhaul communication links (shown in FIGS. 1 and 2 using a solid line). This routing zone is also referred to here as a "central" routing zone. The central routing zone does not include functionality for local switching within that routing zone.

In the particular embodiment shown in FIGS. 1 and 2, the elements of the BSSs 104 that are implemented in routing zones A, B, C, D, and E are communicatively coupled to one another using a respective Internet Protocol (IP) network 112 (not shown with respect to routing zone E). The IP networks 112 can be implemented in various ways (for example, using wired and/or wireless communication links). In routing zones A, B, C, D, and E the BTSs 108 communicate with the respective BSC 106 over the IP network 112 using an IP-based interface (for example, an Abis over IP interface), and the BSCs 106 are configured to communicate with an MSC using an A-over-IP interface. Also, routing zone C includes a hub 116 (or other inter-networking device) that is used to couple the IP network 112 of routing zone C to the IP network 112 of routing zone B so that the BTSs 108 of routing zone C can be controlled by the BSC 106 in routing zone B.

In this embodiment, the BSCs 106 in the remote routing zones A, B, and C include appropriate functionality (such as Media Gateway Control Protocol (MGCP) client functionality) to cause voice and data communications handled by the respective BSSs 104 to be locally switched using the underlying IP network 112 to route the voice and data packets as needed.

In the particular embodiment shown in FIGS. 1 and 2, remote routing zone D makes use of a circuit-switched BSS 104 in which the BTSs 108 are coupled to the respective BSC 106 over circuit-switched (TDM) communication links and the BSC 106 is configured to communicate with an MSC over a circuit-switched A interface. In this routing zone D, a local media gateway (MG) 114 is used to communicatively couple the circuit-switched BSC 106 to the IP backhaul link. The local MG 114, at a minimum, includes functionality for handling the local switching of voice and data services. The local MG 114 performs this local switching under the control of the VBSC 122 (described below). The local MG 114 also includes other media gateway functionality, such as media conversion functionality for converting between packetized call data and TDM formats if necessary and/or to bandwidth optimize call data for satellite backhaul links while maintaining high voice quality (for example, using a G.729b codec).

The host PLMN 102 includes a network switching subsystem (NSS). In the embodiment shown here, some of the NSS equipment is located in a networks operation center (NOC) that is physically remote from the remote routing zones A, B, C, D, and E. The NSS is communicatively coupled to a public switched telephone network (PSTN) (for example, for voice communications), to data networks (such as the Internet), and to other public land mobile networks (none of which are shown in FIGS. 1 and 2). The NSS of the host PLMN 102 implements switching functionality, authorizes subscribers, obtains and maintains subscriber information, and provides applications and call features to subscribers of the host PLMN 102 (such as call ringing, roaming, voice mail, short message service). The NSS of the host PLMN 102 comprises a mobile switching center (MSC) and a visitor location register (referred to here collectively as the "host MSC/VLR" 116). The host MSC/VLR 116 implements conventional GSM MSC and VLR functionality (such as call processing, switching, mobility management, and handover handling) for wireless devices that are currently located within a coverage area associated with the host PLMN 102.

In the particular embodiment shown in FIGS. 1 and 2, the host MSC/VLR 116 is designed to communicate with base station subsystems over a circuit-switched GSM A interface (implemented using a conventional time division multiplexing (TDM) backhaul link such as one or more T1 or E1 links). However, in the particular embodiment shown in FIGS. 1 and 2, the BSSs 104 are designed to communicate with a MSC/VLR using a GSM A interface that is implemented over an IP link (also referred to here as an "A-over-IP" interface).

The NSS of the host PLMN 102 also includes various nodes for implementing Intelligent Network functionality in the host PLMN 102. For example, in the particular embodiment shown in FIGS. 1 and 2, the host PLMN 102 also includes a service control function (SCF) and specialized resource function (SRF) 118 that implement conventional SCF and SRF functionality.

The NSS also includes a conventional Serving GPRS Support Node (SGSN) 120 to support providing GPRS service to the BSSs 104. In the particular embodiment shown in FIGS. 1 and 2, the SGSN 120 is designed to interface with a PCU over a GPRS Gb interface implemented over a Frame Relay backhaul communication link. However, the PCU functionality included in the BSSs 104 is configured to communicate using the GPRS Gb interface implemented over an IP link (also referred to here as a "Gb-over-IP" interface).

In the embodiment shown in FIGS. 1 and 2, the host MSC/VLR 116 is coupled to the BSSs 104 by a virtual base station controller (VBSC) 122. The BSSs 104 are communicatively coupled to the VBSC 122 via an IP network 124. The VBSC 122 is configured to communicate with the BSC 106 using the A-over-IP interface that is implemented over the IP network 124. The host MSC/VLR 116 is coupled to the VBSC 122 over one or more TDM links.

Referring to FIG. 2, the VBSC 122 includes a central media gateway 126 that handles media conversion between the media formats used in the BSSs 104 and the media formats used in the rest of the PLMN 102 or other network to which the PLMN 102 is communicatively coupled (such as the PSTN or another PLMN). In the embodiment shown in FIG. 1, each BSS 104 communicates call data over the respective IP network 112 as data packets using the Real-time Transport Protocol (RTP), whereas other formats are used in the rest of the PLMN 102 (for example, one or more TDM media formats). In such an embodiment, the central media gateway 126 in the VBSC 122 handles the conversion between the packetized RTP call data and the TDM formats. Moreover, the central media gateway 126 performs appropriate media conversions for bandwidth optimizing call data for communication over satellite backhaul links.

The VBSC 122 comprises its own MSC functionality 128 that is used for interpreting control-plane messages (for example, call setup and mobility management messages) that are sent to or received from the host MSC/VLR 116 of the PLMN 102 and sent to or received form the BSCs 106. The MSC functionality 128 implements appropriate protocol stacks for the VBSC 122 to process such control-plane messages as described below.

The VBSC 122 also comprises a Private A-link Intelligent Multiplexor (PALIM) function 130. The PALIM function 130 is used to logically couple the rest of the elements of the VBSC 122 to the circuit-switched A interface used to couple the VBSC 122 to the host MSC/VLR 116. The PALIM function 130 detects and processes various types of control-plane messages (for example, call setup and mobility management messages) that are communicated over the circuit-switched A-interface coupled to the host MSC/VLR 116 and over the A-over-IP interface coupled to the BSSs 104.

The VBSC 122 is configured to appear, from the perspective of the BSCs 106 of each of the BSSs 104, to be the MSC/VLR for those BSCs 106. The VBSC 122 is also configured to appear, from the perspective of the host MSC/VLR 116, to be the single BSC that controls all of the BTSs 108. In other words, even though the PLMN 102 includes multiple BSCs 106, the host MSC/VLR 116 need only be configured to interact with a single VBSC 122. The PALIM function 130 of the VBSC 122 handles the routing of messages from the host MSC/VLR 116 to the appropriate actual BSC 106 and the routing of messages from the actual BSCs 106 to the host MSC/VLR 116.

In the embodiment shown in FIGS. 1 and 2, the BSCs 106 and the VBSC 122 (when the VBSC 122 communicates with the BSCs 106) are configured to use "private" point codes (or other addresses) that are not seen by the rest of the PLMN 102. The VBSC 122 is also allocated a valid point code from the point code range used in rest the PLMN 102. This point code is also referred to here as the "public" point code for the VBSC 122. The PALIM functionality 130 of the VBSC 122 performs any point code address translation that is necessary for messages that are sent from the BSCs 106 to the VBSC 122 and for messages that are sent from the host MSC/VLR 116 to the VBSC 122.

For example, for messages that are sent from the BSCs 106 to the VBSC 122, the PALIM function 130 of the VBSC 122 modifies the originating point code by replacing the private point code of the BSC 106 that sent the message with the public point code of the VBSC 122. For messages ultimately intended for a BSC 106 that are sent from the host MSC/VLR 116, the PALIM function 130 of the VBSC 122 modifies the originating point code by replacing the public point code of the VBSC 122 with the private point code of the BSC 106 that the message is intended for. The PALIM function 130 of the VBSC 122 maintains a stateful translation table for performing such address translation by inspecting messages that pass through the PALIM function 130 (for example, using the International Mobile Subscriber Identity (IMSI) number of the mobile stations that are communicating via each BSC 106). For example, when a mobile station moves into a coverage area associated with one of the BSSs 104, the authentication and location update messages the mobile station sends and receives will go through the PALIM function 130 of the VBSC 122, which performs any necessary point code address translation for such messages.

The VBSC 122 includes a Media Gateway Control (MGC) function 132 that controls the central media gateway 126 in the VBSC 122 and any local media gateways 114 in the BSSs 104 using the Media Gateway Control Protocol (MGCP). The MGC function 132 is also able to communicate with the MGCP functionality in the IP BSCs 106 in routing zones A, B, C, and E. The MGC function 132 communicates with the local MGs 114 and the IP BSCs 106 over the IP network 124. The VBSC 122 also includes a RTP local switching (RLS) function 134 that is configured to determine if a call handled by the VBSC 122 should be locally switched and, if that is the case, instruct the MGC function 132 to have the call locally switched.

In particular, the PALIM function 130 inspects control-plane messages that are communicated between BSSs 104 and host MSC/VLR 116 and determines when the central MG 126 needs to setup one leg of a telephone call by connecting a TDM channel from the circuit-switched A interface and a corresponding IP media stream from the BSS 104 that is handling the relevant mobile station. The TDM channel is assigned by the host MSC/VLR 116 for the call and is typically identified by a circuit identity code (CIC) that is communicated to the VBSC 122 in a BSSMAP message. This TDM channel is sometimes referred to here simply as a "CIC." When the PALIM function 130 determines a leg of call needs to be setup, the PALIM function 130 requests that the MGC function 132 connect the CIC assigned to that leg with the corresponding IP media stream from the relevant BSS 104. When the MGC function 132 receives such a request, it forwards the request to the RLS function 134. The RLS function 134 checks if both legs (that is, the mobile originated (MO) and mobile terminated (MT) legs) of the call are terminated in the same routing zone and, if that is the case, checks if that routing zone is configured for local switching. If that is the case, the RLS function 134 instructs the MGC function 132 to instruct the relevant local MG 114 or IP BSC 106 to locally switch within the routing zone, thereby avoiding having to backhaul the call bearer traffic over the backhaul link.

Since the VBSC 122, in this particular embodiment, does not have access to the subscriber information stored in the VLR of the host MSC/VLR 116, the RLS function 134 cannot use the subscriber information stored in the host MSC/VLR 116 to help it check if both legs of a call terminate in the same routing zone.

The control-plane messages for the MO leg of a call will identify the called MT mobile station by MSISDN, not by its IMSI or TMSI. However, when the host MSC/VLR 116 sets up the MT leg of the call, the control-plane message sent from the host MSC/VLR 116 only include the IMSI or TMSI of the called MT mobile station. As result, the RLS function 134 needs another mechanism to help it check if both legs of a call terminate in the same routing zone. In the particular embodiment shown in FIGS. 1 and 2, the PALIM function 130 maintains a table 136 (shown in FIG. 2) that is used to store subscriber information that can be used by the RLS function 134 to determine if both legs of a call terminate in the same routing zone. Examples of how this is done are described below in connection with FIGS. 3-6.

When a call is locally switched by a local MG 114 or IP BSC 106, CICs assigned by the host MSC/VLR 116 to the MO and MT legs of the call are not released. The VBSC 122 includes voice insert monitor (VIM) function 138. When a call is locally switched by a local MG 114 or IP BSC 106, the VIM function 138 monitors both CICs assigned by the host MSC/VLR 116 to the call for any alerts or other messages that might be communicated to the mobile stations involved in the call. Examples of such alerts include pre-paid service-related SRF alerts (for example, alerts indicating that a pre-paid subscriber is about to run out of pre-paid time). For instance, when the SCF/SRF 118 sends an alert over the CIC assigned by the host MSC/VLR 116 to the call, the VIM function 138 of the VBSC 122 will detect that alert, cause the MGC function 128 to instruct the relevant local MG 114 or IP BSC 106 to tear down the local cross-connection it established and to cross-connect both legs of the call using the CICs assigned by the host MSC/VLR 116. In this way, the mobile stations will be able to receive any such alerts. In one implementation of such an embodiment, once the local cross-connection is torn down and both legs are connected to their respective CIC for cross-connection by the host MSC/VLR 116, the call remains set up that way for the remainder of the call.

In the particular embodiment shown in FIGS. 1 and 2, the VBSC 122 also includes GPRS network address translation (GNAT) functionality 140 (shown in FIG. 2). The GNAT functionality 140 implements conventional GNAT functions, as well as providing a bridge between the Gb-over-IP interface used by the PCU functionality in the BSSs 104 and the Gb-over-FR interface used by the SGSN 120 of the host PLMN 102. The GNAT functionality 140 also aggregates the multiple Gb-over-IP interfaces into a single Gb-over-FR interface.

The embodiment of FIGS. 1 and 2 can be used, for example, where the backhaul IP network 124 is implemented over relatively expensive and/or low bandwidth links (such as satellite or microwave links). In one such application, for example, one or more of the BSSs 104 are located in remote areas (for example, on islands). In such an application, one or more of the BSSs 104 are communicatively coupled to the VBSC 122 and host PLMN 102 over satellite links. In such applications, the local switching that is provided in the embodiment shown in FIGS. 1 and 2 can be used to reduce the amount of traffic that is communicated over the satellite backhaul links.

Moreover, the embodiment of FIGS. 1 and 2 can be used, for example, where alternative BSS configurations (for example, picocell and microcell BSSs) are used with MSC equipment that was designed for use with conventional macrocell BSS equipment. The VBSC 122 appears to such a macrocell MSC to be a single, conventional circuit-switched macrocell BSC, while the VBSC 122 appears to be the MSC/VLR for the BSSs. In this way, the macrocell MSC can be configured as if there is only a single, conventional BSC coupled to it, which can make it easier to plan and configure the PLMN 102, while using alternative BSS configurations where doing so is advantageous.

In some implementations of the embodiment shown in FIGS. 1 and 2, the MSC functionality 128 of the VBSC 122 performs the handover processing for some types of handovers. For example, the MSC functionality 128 of the VBSC 122 can be configured to handle intra-cell handovers (that are not otherwise handled by the relevant BSCs 106 or BTSs 108), inter-cell handovers within the same BSS (that are not otherwise handled by the relevant BSCs 106), and intra-MSC handovers among the BSSs 104 that are serviced by the VBSC 122. In such implementations, the PALIM function 130 would identify the control-plane messages related to such handovers and forward them to the MSC functionality 128 for handling. In this way, the host MSC/VLR 116 need not handle such handover processing, which may be substantial if there is a larger number of BSSs 104 and/or if the associated coverage areas are small. Also, the VBSC 122 can be configured to notify the MSC/VLR 116 of the PLMN 102 when such handover are completed. Optionally, the VBSC 122 can be configured to perform such handovers in a manner that is completely transparent to the host MSC/VLR 116 to offload all non-revenue based signaling.

In some embodiments, the VBSC 122 is also configured to provide differentiated classes of service. For example, the PALIM function 130 of the VBSC can be configured as described in U.S. Pat. No. 5,818,824 to support private subscribers and/or hybrid subscribers as well as regular public subscribers. As used here, a private subscriber is a subscriber who is only able to make calls to and receive calls from other private subscribers. Each private subscriber has an assigned "private" MSISDN that can only be called by other private subscribers. Also, each private subscriber is not able to roam onto other providers' networks. A hybrid subscriber is a subscriber who is able to make calls to and receive calls from both private subscribers and other regular public subscribers. Each hybrid subscriber has an assigned private MSISDN that other private subscribers and hybrid subscribers can use to call the hybrid subscriber when the hybrid subscriber is in a location area associated with one of the BSSs 106 and an assigned "public" MSISDN that public subscribers and other hybrid subscribers can use to call the hybrid subscriber regardless of what network the hybrid subscriber is using at the time any such call is made. In such embodiments, the VBSC 122 (more specifically, the MSC functionality 128 and a HLR 129) are configured to handle the MSC/HLR/VLR functions for the private MSISDN numbers assigned to the private subscribers and the hybrid subscribers. The PALIM function 130, in such embodiments, implements A-interface multiplexing (described in the U.S. Pat. No. 5,818,824) to seamlessly provide "private" wireless service in connection with the private MSISDN numbers assigned to the private subscribers and hybrid subscribers while also providing "public" wireless service to public subscribers (including both roamers and home subscribers of the PLMN 102). The VBSC 122 can also used to provide other differentiated services for private or hybrid subscribers such as priority calling (for example, with capacity reserved) or special services (for example, abbreviated dialing or push-to-talk (PTT) service).

In one implementation of such a PALIM embodiment, the VBSC 122 is also configured to automatically setup roamers as hybrid subscribers in a manner similar to what is described in U.S. patent application Ser. No. 12/199,335, filed on Aug. 27, 2008, entitled "OPEN TO ALL PREPAID ROAMING SYSTEMS AND METHODS", which is also referred to here as the "'335 Application" and is hereby incorporated herein by reference. The VBSC 122 would discover each roamer's public MSISDN assigned by its home network using the techniques described below. The VBSC 122 could be configured to automatically assign each roamer (newly created hybrid user) a private MSISDN number that the roamer could use to receive calls from private users or other hybrid users while the roamer is within a coverage area associated with the VBSC 122. The private MISDN number could be used to provide the Open to all Prepaid Roaming (OPR) service described in the '335 Application.

Also, the PALIM function 130 can be implemented using the iPALIM functionality described in U.S. patent application Ser. No. 12/492,344, filed Jun. 26, 2009, entitled "PRIVATE CELLULAR SYSTEM WITH AUTO-REGISTRATION FUNCTIONALITY", which is hereby incorporated herein by reference and is also referred to here as the "'344 Application".

Moreover, the PALIM function 130 can be configured, in one implementation, to allow operators of the wireless network to control which mobile users are allowed to register (white list) or disallowed from registering (black list) with the host PLMN 102 using the registration functionality in the PALIM function 130. This registration control function prohibits "illegal" visitors (that is, visitors who are not allowed to register) from registering with the host PLMN 102 using the PALIM function 130. The PALIM function 130 is configured to send a "Location Area Updating Reject" message to the illegal visitor's mobile to indicate the cause of rejection. The PALIM function 130 can be configured so that the wireless network operator can choose one of the following rejection causes depending on the requirements of that operator's network: "PLMN not allowed" (in which case host PLMN 102 will be added to the "Forbidden PLMN List" stored in the visitor's SIM card to prevent the mobile from any further registration attempt with the host PLMN 102), "LA not allowed" (in which case the mobile will not attempt to register with the host PLMN 102 again, unless the mobile has changed its location area), and "Roaming not allowed in this LA" (in which case the selected location area does not accept visitors from another PLMN).

In such an implementation, the PALIM function 130 uses a IMSI Prefix Table that can be configured by the operator as either a "White List" or a "Black List". If the IMSI Prefix Table is configured as a White List, then only users whose IMSI prefix can be found in the IMSI Prefix Table are allowed to register with the host PLMN 102 using the registration functionality in the PALIM function 130. If the IMSI Prefix Table is set as a Black List then only users whose IMSI prefixes are listed in the IMSI Prefix Table are prohibited from registering with the host PLMN 102 using the registration functionality in the PALIM function 130. In other words, a White List is a list of IMSI prefixes that are allowed to register with the host PLMN 102 using the registration functionality in the PALIM function 130, while Black List is a list of IMSI prefixes that are prohibited from registering with the host PLMN 102 using the registration functionality in the PALIM function 130. In such an implementation, the length of an IMSI prefix entry is between 1 and 15 digits. If an IMSI prefix is a 15-digit number then it is a single IMSI number. If it is shorter than 15 digits then all the numbers that begin with this prefix match that IMSI prefix. For example if an IMSI prefix is set to 46001 then all IMSI numbers that begin with 46001 match that IMSI prefix.

The VBSC 122 can also be configured to provide other types of services such as private networks, specialized services, or network access control.

FIGS. 3-6 illustrate methods that can be used to provide information to the RLS function 134 to assist it in identifying calls where both legs of the call are terminated in the same routing zone.

Figure 3:
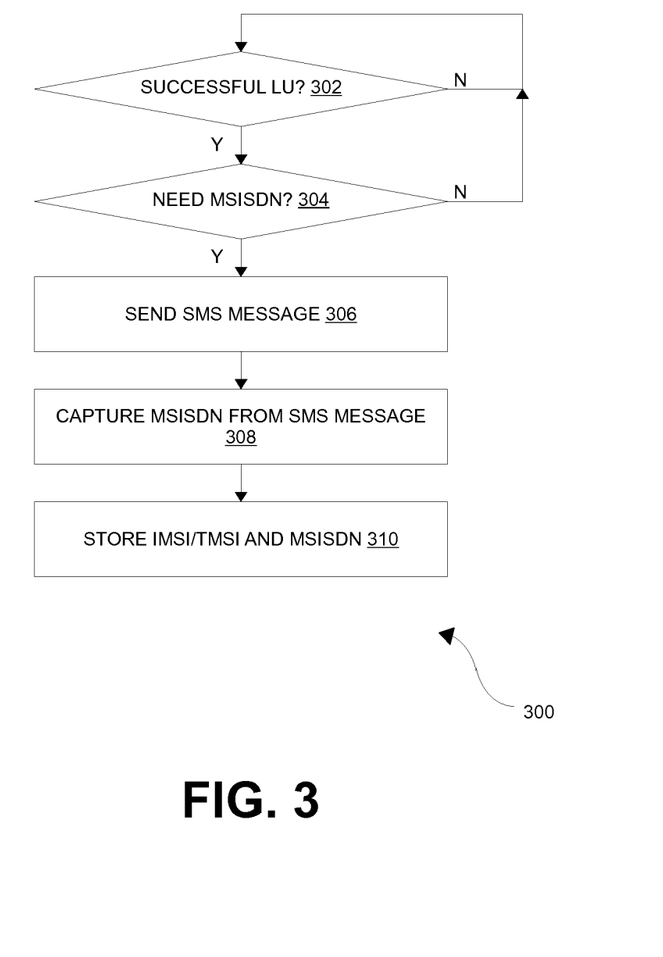
FIG. 3 is a flow diagram of one embodiment of a method of obtaining the MSISDN number of a subscriber.
Figure 4:
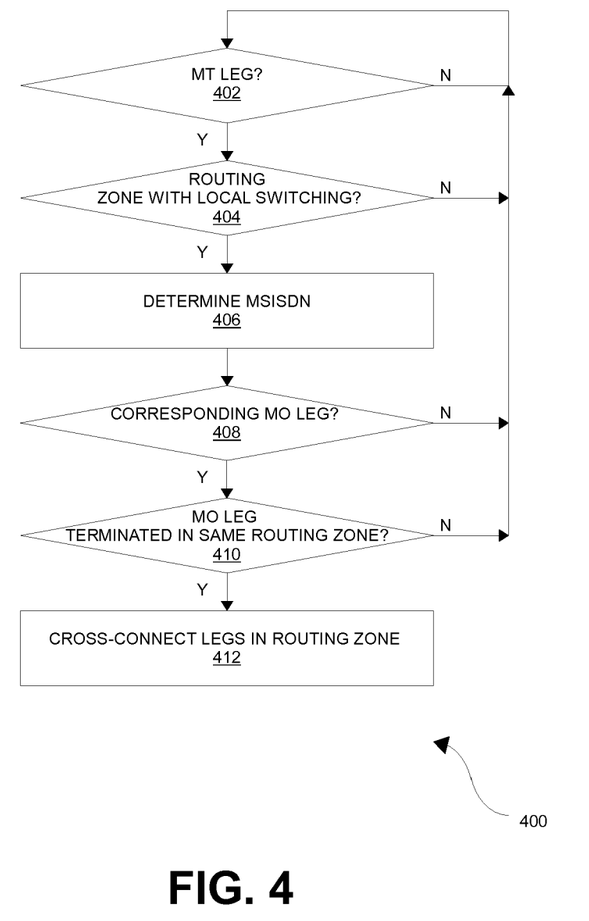
FIG. 4 is a flow diagram of one embodiment of a method of identifying those calls where both legs of the call are terminated in the same routing zone using the MSISDN of the MT mobile station.

FIGS. 3-4 illustrate one approach that makes use of the Mobile Subscriber ISDN Number (MSISDN) of the MT mobile station. In this approach, the PALIM function 130 of the VBSC 122 obtains the MSISDN of each new subscriber that it handles. The VBSC 122, in this example, does not have access to the subscriber data stored by the host MSC/VLR 116. As a result, the MSISDN numbers of the subscribers (and associated mobile stations) handled by the VBSC 122 cannot be obtained from the host MSC/VLR 116. FIG. 3 is a flow diagram of one embodiment of a method 300 of obtaining the MSISDN number of a subscriber. Method 300 is described here as being implemented in the system of FIGS. 1 and 2, though other embodiments can be implemented in other ways.

When a mobile station enters a coverage area associated with one of the routing zones 110 and successfully completes a location update (checked in block 302), the PALIM function 130 of the VBSC 122 checks if it needs to obtain the MSISDN for that subscriber (checked in block 304). The PALIM function 130 does this by taking the IMSI or TMSI from the location update message and checking the subscriber information table 136 to see if the PALIM function 130 needs to obtain the MSISDN for that subscriber (for example, because the table 136 does not contain any information for that subscriber either because the MSISDN has never been obtained for that subscriber or because the subscriber's information has been purged from the table 136).

If the MSISDN for the subscriber is needed, the PALIM function 130 causes a short-message service (SMS) message to be sent on behalf of the mobile station to a predetermined virtual subscriber maintained by the VBSC 122 (block 306). As shown in FIG. 2, the VBSC 122 includes a user equipment simulator (UES) 142 that simulates an item of user equipment. The UES 142 is used to send the SMS message of block 306 by sending the same type of message that the new mobile station would send if the subscriber was using that mobile station to send the SMS message. The UES 142 uses a MSISDN assigned to the virtual subscriber as the destination address of the SMS message, the mobile station's captured IMSI or TMSI as the originating address, and the address of an SMS Center (SMSC) included in the host PLMN 102. The UES 142 sends the SMS message to the host MSC/VLR 116, which forwards the message onto the SMSC included in the host PLMN 102. The SMSC handles delivering the SMS message to the virtual subscriber in the normal manner. The virtual subscriber is a special subscriber of the host PLMN 102 that is used only for the processing described here in connection with method 300. The VBSC 122 is configured so that the virtual subscriber appears to the host MSC/VLR 116 (and the rest of the PLMN 102) as being located in a coverage area associated with the VBSC 122, which causes the SMS messages to be routed to the VBSC 122 for delivery. The UES 142 receives the SMS message.

When the SMS message is delivered to the virtual subscriber (that is, to the UES 142), the PALIM function 130 captures the MSISDN number for the mobile station from the delivered SMS message (block 308). The delivered SMS message will include the MSISDN number for the subscriber that sent the SMS message, which is the MSISDN number of the subscriber associated with the mobile station that performed the location update. The UES 142 provides the MSISDN number to the PALIM function 130. Then, the PALIM function 130 stores the IMSI or TMSI number and captured MSISDN number for the subscriber in the subscriber information table 136 it maintains (block 310).

FIG. 4 is a flow diagram of one embodiment of a method 400 of identifying those calls where both legs of the call are terminated in the same routing zone 110 using the MSISDN of the MT mobile station. Method 400 is suitable for use in those implementations where the VBSC 122 uses method 300 to obtain the MSISDN of subscribers being handled by the VBSC 122. Method 400 is described here as being implemented in the system of FIGS. 1 and 2, though other embodiments can be implemented in other ways.

When the RLS function 134 detects that a MT leg of a call is being setup using the VBSC 122 (checked in block 402), the RLS function 134 checks if the routing zone 110 in which that MT leg is terminated supports local switching (block 404). If it does, the RLS function 134 uses the IMSI or TMSI of the MT leg to determine the MSISDN of the MT mobile station (block 406). The RLS function 134 does this by interrogating the PALIM function 130. The PALIM function 130 uses IMSI or TMSI provided by the RLS function 134 to search the subscriber information table 136 that it maintains using the IMSI or TMSI of the MT mobile station in order to locate the corresponding subscriber record for that MT mobile station. The subscriber record contains the MSISDN for the MT mobile station. The MSISDN for the MT mobile station is provided to the RLS function 134.

Then, the RLS functionality 129 checks all of the MO legs that it is handling to see to see if any of those MO legs correspond to the current MT leg (checked in block 408). The RLS function 134 does this by checking each MO leg to see if the MSISDN of the called MT mobile station for that MO leg corresponds to the MSISDN received in block 406. If the RLS function 134 finds a MO leg that corresponds to the current MT leg, the RLS function 134 checks if the MO leg is terminated in the same routing zone as the MT leg (block 410). If it is, the RLS function 134 instructs the MGC function 132 to cause the local MG 114 or IP BSC 106 in that routing zone to cross-connect the legs of the call (block 412).

Figure 5:
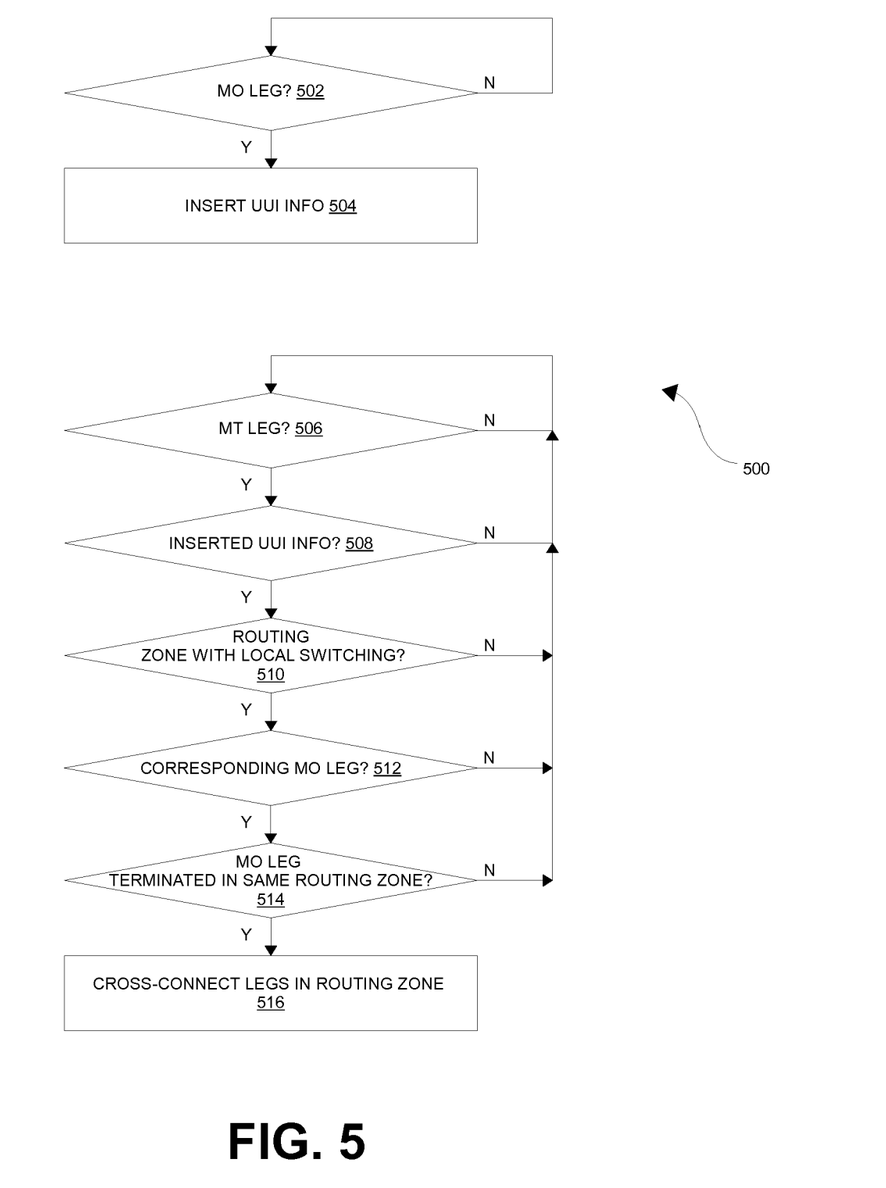
FIG. 5 is a flow diagram of another embodiment of a method of identifying those calls where both legs of the call are terminated in the same routing zone using user-to-user information inserted in the mobile originated (MO) leg.

FIG. 5 is a flow diagram of another embodiment of a method 500 of identifying those calls where both legs of the call are terminated in the same routing zone 110. The embodiment of method 500 shown in FIG. 5 makes use of User-to-User Signaling (UUS), which is provided as a supplementary service in some telephone systems. UUS provides a mechanism for the transmission of a limited amount of subscriber generated information (also referred to here "User-to-User Information" or "UUI") to and/or from another user in association with a call. The UUS-related specifications and standards specify that the network elements that mediate the communications between the users do not interpret the UUI or act upon it in any way (that is, the UUI is passed "transparently" through the network).

When the PALIM function 130 handles the MO leg of a call (checked in block 502), the PALIM function 130 inserts UUI information into the signaling messages that it forwards for the MO leg (block 504). The inserted UUI information includes information that can be used to identify the mobile station and routing zone 110 from which the MO call leg originated. For example, in one implementation, the inserted UUI information includes the IMSI or TMSI of the MO mobile station and an identifier for the corresponding routing zone. This UUI information will be transparently passed to the MT leg of the call.

When the RLS function 134 detects that a MT leg of a call is being setup using the VBSC 122 (checked in block 506), the RLS function 134 checks if the control-plane messages for the MT leg of the call include UUI information of the type inserted into MO call legs by the PALIM function 130 in connection with block 504 (block 508). If such UUI information has been inserted, the RLS function 134 checks if the routing zone 110 in which that MT leg is terminated supports local switching by inspecting the routing zone identifier that is included in the inserted UUI (block 510). If it does, the RLS function 134 checks all of the MO legs that it is handling to see to see if any of those MO legs correspond to the current MT leg (checked in block 512). The RLS function 134 does this using the MO IMSI or TMSI that is included in the inserted UUI information. The RLS function 134 checks if the inserted MO IMSI/TMSI matches the MO IMSI/TMSI of any of the MO legs it is currently handling. If there is a match, the RLS function 134 checks if the matching MO leg is terminated in the same routing zone as the MT leg (block 514). If it is, the RLS function 134 instructs the MGC function 132 to cause the local MG 114 or IP BSC 106 in that routing zone to cross-connect the legs of the call (block 516).

Figure 6:
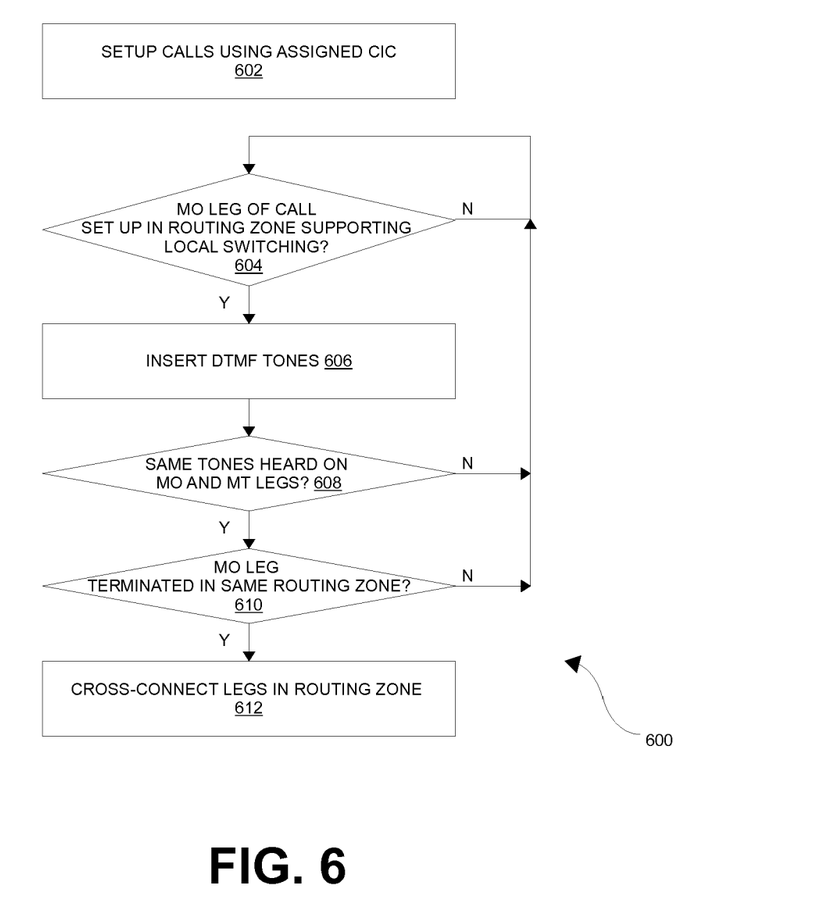
FIG. 6 is a flow diagram of another embodiment of a method of identifying those calls where both legs of the call are terminated in the same routing zone using a dual-tone multi-frequency tone (DTMF) inserted in the mobile originated (MO) leg.

FIG. 6 is a flow diagram of another embodiment of a method 600 of identifying those calls where both legs of the call are terminated in the same routing zone 110. The embodiment of method 600 shown in FIG. 6 makes use of dual-tone multi-frequency (DTMF) tones.

In this embodiment, the RLS function 134 sets up each leg of a call that is handled by the VBSC 122 using the CIC assigned by the host MSC/VLR 116 (block 602). When the RLS function 134 setups up the MO leg of a call that is terminated in a routing zone that supports local switching (checked in block 604), the RLS function 134 causes a predetermined DTMF tone or sequence of DTMF tones to be inserted into the MO leg of the call (using the central media gateway 126) (block 606). The RLS function 134 listens (using the central media gateway 126) for the inserted DTMF tone or tones on all of the MT legs that it is currently handling. If the same inserted DTMF tone or tones are detected on both an MO leg and an MT leg (checked in block 608), the RLS function 134 checks if the MO leg and MT leg are terminated in the same routing zone (block 610). If they are, the RLS function 134 instructs the MGC function 132 to cause the local MG 114 or IP BSC 106 in that routing zone to cross-connect the legs of the call (block 612).

The functionality described here as being implemented by the VBSC 122 can be implemented in various ways. For example, the VBSC 122 can be implemented as software that executes on a server. Such a server, for example, can comprise one or more programmable processors for executing the software and memory for storing the program instructions and any related data. The software comprises program instructions that are stored (or otherwise embodied) on an appropriate storage medium or media (such as flash memory) from which at least a portion of the program instructions are read by the programmable processor for execution thereby. Such a server also includes appropriate interfaces to communicatively couple the server to the other elements of the PLMN.

Figure 7:
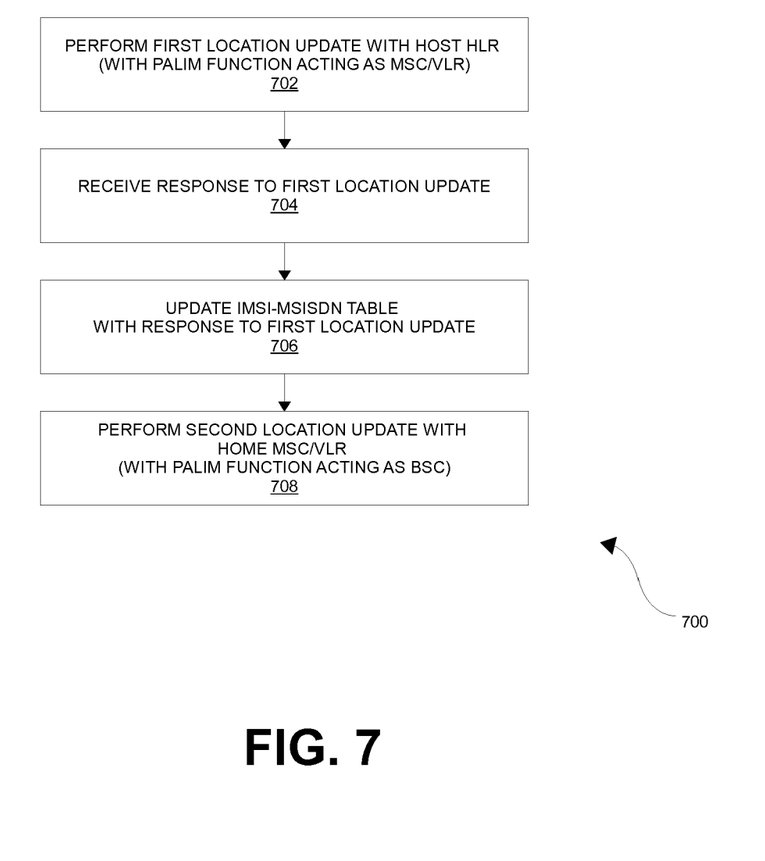
FIG. 7 is a block diagram of one embodiment of a method that is performed by the PALIM function when a mobile station that is located within one of the remote routing zones performs a location update.

FIG. 7 is a block diagram of one embodiment of a method 700 that is performed by the PALIM function 130 when a mobile station that is located within one of the remote routing zones 110 performs a location update. Method 700 is suitable for use in those implementations where the PALIM function 130 is used as the interface to the host PLMN 102 and where the host PLMN 102 supports the MAP protocol over the communication link that couples the VBSC 122 to the host PLMN 102.

When a mobile station that is located within one of the remote roaming zones 110 performs a location update, the PALIM function 130 performs a "double location update". The PALIM function 130 performs a "first" location update directly with the HLR 119 of the host PLMN 102 (block 702 of FIG. 7). This first location update is a "pseudo" location update that is generated by the PALIM function 130 based on the information provided in the location update message received from the mobile station. The PALIM function 130 uses the MAP protocol to perform the first location update directly with the HLR 119 in the host PLMN 102 and appears, from the perspective of the host HLR 119, to be a MSC/VLR when performing the first location update. The host HLR 119 will process the first location update in the normal manner and send a response to the first location update to the PALIM function 130 using the MAP protocol. The response to the first location update includes the subscriber information (for example, the subscriber's IMSI and MSISDN information) for that mobile. The PALIM function 130 receives the response to the first location update (block 704) and update the IMSI-MSISDN table 136 that it maintains (block 706). In this way, the PALIM function 130 (and, more generally, the VBSC 122) will obtain the subscriber information for the mobile station.

After the first location update is completed, the PALIM function 130 performs a "second" location update with the MSC/VLR 116 in the host PLMN 102 (block 708). The second location update is the "normal" location update that uses the location update message received from the mobile station. The PALIM function 130 appears, from the perspective of the MSC/VLR 116, to be a BSC when performing the second location update and uses the A-interface to forward the location update message to the host MSC/VLR 116. The host MSC/VLR 116 processes the second location update in the normal manner by performing a second location update with the host HLR 119. The host HLR 119 processes the second location update in the normal manner and updates the HLR subscriber record for that mobile station to indicate that that mobile station is roaming in the host PLMN 102. The host HLR 119 also sends a response to the second location update to the host MSC/VLR 116, which updates its VLR with the subscriber information included in the response. As a result of the double-location update, the PALIM function 130 is able to obtain the subscriber's information while still having the mobile station properly registered with the home PLMN 102.

Also, the VBSC 122 described here can be configured to support the cascading VBSC architectures and accurate paging techniques described in the '344 Application.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A wireless system comprising:
   a host MSC/VLR of a public land mobile network (PLMN);
   a plurality of base station subsystems (BSSs), each BSS of the plurality of BSSs including a base station controller (BSC) and one or more base transceiver stations (BTSs); and
   a virtual base station controller (VBSC) communicatively coupled to the plurality of BSSs and the host MSC/VLR such that the host MSC/VLR and other devices in the PLMN communicate with the plurality of BSSs via the VBSC;
   wherein:
   the VBSC is coupled to the PLMN;
   the VBSC can appear, from a perspective of the host MSC/VLR, to be a local base station controller for the one or more BTSs of the plurality of BSSs;
   the VBSC can appear, from a perspective of the BSCs of the plurality of BSSs, to be a local MSC/VLR for the BSCs of the plurality of BSSs while the VBSC appears, from a perspective of the host MSC/VLR, to be the local base station controller for the one or more BTSs of the plurality of BSSs;
   the VBSC and at least one of the plurality of BSSs include functionality for locally switching telephone calls in the plurality of BSSs;
   the VBSC can further insert user-to-user (UUI) information into control-plane messages of mobile originated (MO) legs of the telephone calls handled by the VBSC;
   the VBSC can further check for the UUI information in control-plane messages of mobile terminated (MT) legs of the telephone calls handled by the VBSC; and
   the VBSC can further use the UUI information to match the MO and MT legs of the telephone calls in order to determine if the telephone calls should be locally switched.

2. The wireless system of claim 1, wherein:
   the VBSC is communicatively coupled to the plurality of BSSs over a first GSM A interface implemented over a first IP network;
   the VBSC is communicatively coupled to the host MSC/VLR over a circuit-switched GSM A interface or over a second GSM A interface implemented over a second IP network; and
   at least one of the plurality of BSSs includes a local media gateway configured to switch the telephone calls in the at least one of the plurality of BSSs.

3. The wireless system of claim 1, wherein the VBSC is configured to perform point code address translation for messages sent between the plurality of BSSs and the host MSC/VLR.

4. The wireless system of claim 1, wherein: at least one of the plurality of BSSs comprises at least one of a microcell or a picocell.

5. The wireless system of claim 1, wherein: the VBSC is communicatively coupled to the plurality of BSSs using one or more microwave or satellite links.

6. The wireless system of claim 1, wherein:
   the VBSC is further configured to insert a dual-tone multi-frequency (DTMF) tone or tones into the mobile originated (MO) legs of the telephone calls handled by the VBSC; and
   the VBSC is further configured to check for the DTMF tone or tones in the mobile terminated (MT) legs of the telephone calls handled by the VBSC;
   the VBSC is further configured to use the DTMF tone or tones to match the MO and MT legs of the telephone calls in connection with determining if the telephone calls should be locally switched.

7. The wireless system of claim 1, wherein:
   the VBSC is configured to support at least one of private subscribers, public subscribers, or hybrid subscribers.

8. The wireless system of claim 1, wherein:
   when a telephone call is locally switched, the VBSC is further configured to monitor circuits assigned to a telephone call by the host MSC/VLR for any alerts;
   if any alerts are communicated on the circuits, the VBSC is further configured to undo the local switching of the telephone call and connect legs of the telephone call to the circuits assigned by the host MSC/VLR; and
   the telephone calls comprise the telephone call.

9. A wireless system in communication with a public land mobile network (PLMN), the PLMN comprises a host MSC/VLR, the wireless system comprising:
   two or more base station subsystems (BSSs), each BSS of the two or more BSSs comprises one or more base transceiver stations (BTSs);
   a controller system that can communicatively couple the host MSC/VLR to the two or more BSSs such that the two or more BSSs communicate to the host MSC/VLR via the controller system,
   wherein:
   the controller system can route control plane messages received from the host MSC/VLR to an appropriate one of the two or more BSSs;
   the controller system can perform point-code address translation for messages communicated between the host MSC/VLR and the two or more BSSs;
   the controller system can determine when telephone calls received by the two or more BSSs should be locally switched;
   the controller system can appear, from a perspective of the host MSC/VLR, to be a local base station controller for the one or more BTSs of the two or more BSSs;
   the controller system can appear, from a perspective of the two or more BSSs, to be an MSC/VLR for the two or more BSSs while the controller system appears, from the perspective of the host MSC/VLR, to be the local base station controller for the one or more BTSs of the two or more BSSs;
   the controller system can further insert user-to-user information into control-plane messages of mobile originated (MO) legs of the telephone calls;
   the controller system can further check for the user-to-user information in control-plane messages of mobile terminated (MT) legs of the telephone calls; and
   the controller system can further use the user-to-user information to match the MO and MT legs of the telephone calls when determining if the telephone calls should be locally switched.

10. The wireless system of claim 9, wherein:
each one of the two or more BSSs further comprises:
  a base station controller (BSC); and
  the BSC for each BSS of the two or more BSSs is configured to manage the BTSs and further configured to communicate with the controller system.

11. The wireless system of claim 9, wherein:
the controller system is communicatively coupled to the two or more BSSs over a first GSM A interface implemented over a first IP network;
the controller system is communicatively coupled to the host MSC/VLR over a circuit-switched GSM A interface or over a second GSM A interface implemented over a second IP network; and
at least one of the two or more BSSs comprises a local media gateway for switching the telephone calls in the two or more BSSs.

12. The wireless system of claim 9, wherein:
the controller system is communicatively coupled to the two or more BSSs using one or more satellite links.

13. The wireless system of claim 9, wherein:
the controller system is configured to identify MSISDN number for one or more mobile stations handled by the two or more BSSs by sending a message to a predetermined subscriber for each of the one or more mobile stations; and
the controller system is further configured to capture the MSISDN number of each of the one or more mobile stations from the message.

14. The wireless system of claim 13, wherein:
the controller system is further configured to use the MSISDN number to match the mobile originated (MO) leg and the mobile terminated (MT) leg of the telephone calls in order to determine if the telephone calls should be locally switched.

15. The wireless system of claim 9, wherein:
the controller system is further configured to insert one or more frequency tones into the mobile originated (MO) legs of the telephone calls;
the controller system is further configured to check for the one or more frequency tones in the mobile terminated (MT) legs of the telephone calls; and
the controller system is further configured to use the one or more frequency tones to match the MO and MT legs of the telephone calls when determining if the telephone calls should be locally switched.

16. The wireless system of claim 9, wherein:
the controller system is further configured to support private subscribers, public subscribers, and hybrid subscribers.

17. The wireless system of claim 9, wherein:
when the telephone calls are locally switched, the controller system is configured to monitor one or more circuits assigned to the telephone calls by the host MSC/VLR for one or more alerts; and
if any alerts of the one or more alerts are communicated on the one or more circuits, the controller system is configured to stop local switching of a telephone call of the telephone calls and connect the MO and MT legs of the telephone calls to the one or more circuits to allow the alerts of the one or more alerts to be transmitted to a subscriber.

18. A wireless system in communication with two or more base station subsystems located in a first coverage area, the wireless system comprising:
  a host module that can provide mobile switching and visitor location registration services for wireless devices located in a second coverage area;
  a virtual base station controller that can communicatively couple the host module to the two or more base station subsystems, the virtual base station controller comprising:
    a router module that can route messages between the host module and an appropriate one of the two or more base station subsystems and further can perform point-code address translation for the messages between the host module and the two or more base station subsystems,
  wherein:
    the virtual base station controller is coupled to the host module;
  the first coverage area is different from the second coverage area; the virtual base station controller can function as a base station controller for the two or more base station subsystems from a perspective of the host module; and
  the virtual base station controller can function as a local host module for the two or more base station subsystems from a perspective of the two or more base station subsystems while the virtual base station controller functions as the base station controller for the two or more base station subsystems from the perspective of the host module
  the virtual base station controller can further insert user-to-user information into control-plane messages of a mobile originated leg of a telephone call if the telephone call is locally switched by the virtual base station controller;
  the virtual base station controller can further check for the user-to-user information in a mobile terminated leg of the telephone call if the telephone call is locally switched by the virtual base station controller; and
  the virtual base station controller can further use the user-to-user information to match the mobile originated leg and the mobile terminated leg of the telephone call when the virtual base station controller is determining whether the telephone call should be locally switched.

19. The wireless system of claim 18, further comprising:
a local switching module configured to determine when telephone calls received by the two or more base station subsystems should be locally switched; and
the telephone calls comprise the telephone call.

20. The wireless system of claim 18, wherein:
the virtual base station controller is communicatively coupled to the two or more base station subsystems over a first GSM A interface implemented over a first IP network;
the virtual base station controller is communicatively coupled to the host module over a circuit-switched GSM A interface or over a second GSM A interface implemented over a second IP network; and
at least one of the two or more base station subsystems comprise a local media gateway configured to switch telephone calls in the at least one of the two or more base station subsystems; and
the telephone calls comprise the telephone call.

21. The wireless system of claim 18, wherein:
the virtual base station controller is communicatively coupled using one or more satellite links to at least one of:
the host module; or
at least one of the two or more base station subsystems.

22. The wireless system of claim 18, wherein:
the virtual base station controller is further configured to obtain identifying information for a mobile station by sending an SMS message to a user from the mobile station; and
the virtual base station controller is further configured to capture the identifying information from the SMS message.

23. The wireless system of claim 22, wherein:
the virtual base station controller is further configured to use the identifying information to determine if the telephone call should be locally switched.

24. The wireless system of claim 18, wherein:
the virtual base station controller is further configured to support private subscribers, public subscribers, and hybrid subscribers.

25. A wireless system comprising:
a host MSC/VLR of a public land mobile network (PLMN);
two or more base station subsystems (BSSs), each one of the two or more BSSs comprising:
a base station controller (BSC); and
one or more base transceiver stations (BTSs); and
a virtual base station controller (VBSC) communicatively coupling the two or more BSSs to the host MSC/VLR, the VBSC comprising:
a multiplexer module that can route control plane messages between the host MSC/VLR to an appropriate one of the two or more BSSs and further can perform point-code address translation for the control plane messages communicated between the host MSC/VLR and the two or more BSSs; and
a local switching module that can determine when telephone calls are received by the two or more BSSs if the telephone calls should be locally switched,
wherein:
the host MSC/VLR communicates with the two or more BSSs via the VBSC;
at least one of the two or more BSSs include a local media gateway module that can switch the telephone calls in the at least one of the two or more BSSs;
the VBSC can function as a base station controller for the one or more BTSs in the two or more BSSs from a perspective of the host MSC/VLR;
the VBSC can function as a MSC/VLR for the BSC of the two or more BSSs from a perspective of the BSC of the two or more BSSs while the VBSC functions as the base station controller for the one or more BTSs in the two or more BSSs from the perspective of the host MSC/VLR;
the VBSC can identify MSISDN number for two or more mobile stations handled by the two or more BSSs by sending a SMS message to a predetermined subscriber for each one of the two or more mobile stations; and
the VBSC can capture the MSISDN number from the SMS message to the predetermined subscriber for the each one of the two or more mobile stations.

26. The wireless system of claim 25, wherein
the VBSC is communicatively coupled to the two or more BSSs over a first GSM A interface implemented over a first IP network; and
the VBSC is communicatively coupled to the host MSC/VLR over a circuit-switched GSM A interface or over a second GSM A interface implemented over a second IP network.

27. A wireless system comprising:
a host MSC/VLR of a public land mobile network (PLMN);
a plurality of base station subsystems (BSSs), each BSS of the plurality of BSSs including a base station controller (BSC) and one or more base transceiver stations (BTSs); and
a virtual base station controller (VBSC) communicatively coupled to the plurality of BSSs and the host MSC/VLR such that the host MSC/VLR and other devices in the PLMN communicate with the plurality of BSSs via the VBSC;
wherein:
the VBSC is coupled to the PLMN;
the VBSC can appear, from a perspective of the host MSC/VLR, to be a local base station controller for the one or more BTSs of the plurality of BSSs;
the VBSC can appear, from a perspective of the BSCs of the plurality of BSSs, to be a local MSC/VLR for the BSCs of the plurality of BSSs while the VBSC appears, from a perspective of the host MSC/VLR, to be the local base station controller for the one or more BTSs of the plurality of BSSs;
the VBSC and at least one of the plurality of BSSs include functionality for locally switching telephone calls in the plurality of BSSs;
the VBSC can identify MSISDN number for two or more mobile stations handled by the plurality of BSSs by sending a SMS message to a predetermined subscriber for each one of the two or more mobile stations;
the VBSC can further capture the MSISDN numbers from the SMS message to the predetermined subscriber for the each one of the two or more mobile stations;
the VBSC can further use the captured MSISDN number to match mobile originated (MO) and mobile terminated (MT) legs of a telephone call in order to determine if the telephone call should be locally switched; and
the telephone calls comprise the telephone call.

* * * * *